Nov. 19, 1957 W. D. GABOR 2,813,975
SWEEP GENERATOR
Filed Sept. 20, 1954
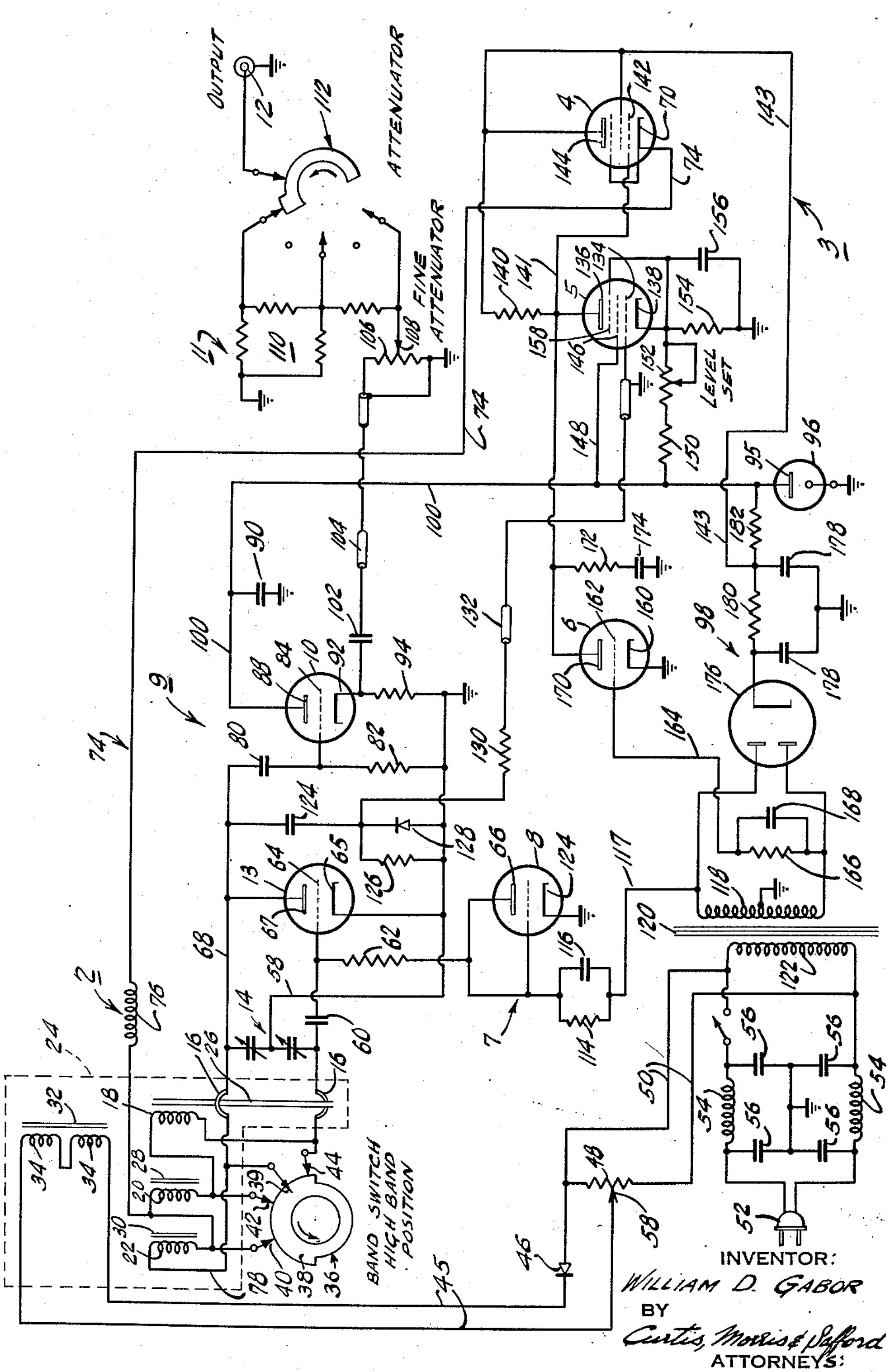
INVENTOR:
WILLIAM D. GABOR
BY
Curtis, Morris & Safford
ATTORNEYS:

2,813,975

SWEEP GENERATOR

William D. Gabor, Norwalk, Conn., assignor to C. G. S. Laboratories, Inc., Stamford, Conn., a corporation of Connecticut Application September 20, 1954, Serial No. 457,227
9 Claims. (Cl. 250—36)

The present invention relates to sweep generator apparatus and more particularly to such apparatus utilizing a controllable inductor for controlling the sweep in frequency.

Among the many advantages of the apparatus described are a wide range of operation and ease of control. The apparatus described is simple in construction and yet avoids the use of any moving parts for producing the cyclic sweeps in frequency.

The sweep generator circuit described is highly suited for repair and adjustment of television receivers. Advantageously, the type of circuit described can provide a sweep which operates either up or down from a readily adjusted starting frequency. The circuit described herein is used to sweep upwardly from the starting frequency.

In conventional generators for producing sweep signals, mechanically operated condensers are often used to produce the desired cyclic sweeps in frequency. These have the disadvantages of shorter life and produce a sweep signal which operates on either side of a center frequency and which is difficult to adjust for making tests at different frequencies and with different frequency deviations.

Among the further advantages of the apparatus described is the fact that the oscillator tank circuit is controlled by the signal windings of a controllable inductor whose inductance is varied by changing the current flow through its control winding. A variable condenser in the oscillator tank circuit is used to adjust the starting frequency of the sweeps.

The operation of this apparatus is easy. For example, in testing TV receivers or other equipment, the adjustable condenser is set to a frequency just below the sweep range desired for use in the test and the magnitude of the variations in the control current is adjusted to produce the range of sweep desired.

The various aspects and advantages of the present invention will be more fully understood from the following description considered in conjunction with the accompanying drawing showing a schematic circuit diagram of sweep generator apparatus embodying the present invention.

The oscillator circuit which is swept in frequency is at the upper left of the drawing and is generally indicated at 2. At the lower right of the drawing is a voltage regulation and control circuit, generally indicated at 3, and including a series regulator tube 4 and a regulator control tube 5. This circuit 3 serves to hold the amplitude of oscillations in the oscillator circuit 2 at a constant amplitude regardless of frequency sweep and shuts off the oscillations as desired at the end of each sweep, as explained in detail below. Near the center of the drawing is shown a tube 6 used as a clamper so as to cause the voltage control circuit 3 to shut off the oscillations at the end of each sweep. Below the oscillator circuit 2 is shown another clamper circuit, generally indicated at 7, including the tube 8 whose action is coordinated with that of the tube 6 to aid in shutting off the oscillations in the circuit 2.

The signal generated by the oscillator circuit is fed through a cathode-follower stage 9, including the triode 10, to attenuator controls 11 and to an output jack 12.

The oscillator circuit 2 is basically a Colpitts oscillator, including a triode 13 and a resonant tank circuit including a two section variable condenser 14 and one or more of four signal windings 16, 18, 20 and 22 of a controllable, inductor illustrated schematically within the dotted area 24. The highest frequency signal winding 16 is divided into two halves around opposite sides of a signal core portion 26, and the next highest frequency signal winding 18 is also included on this same core. The lower frequency, and lowest frequency signal windings 20 and 22, respectively, are wound on a pair of separate signal core portions 28 and 30.

In order to control the frequency of the signals in the circuit 2, the inductance of the signal windings 16, 18, 20, and 22 is varied by changing the permeability of their respective cores 26, 28, and 30 by means of magnetic flux from a control yoke 32 with a control winding thereon divided into two series-connected halves 34. The magnitude of the control current in the windings 34 thus regulates the oscillator frequency. An increase in control current in the windings 34 increases the saturation of the signal cores 26, 28, and 30, lowering the inductance of the signal winding or windings being used, and hence sweeping the resonant frequency of the oscillator tank circuit up and accordingly sweeping upwardly the frequency of the signals generated.

In order to switch the oscillator 2 from one to another of four frequency bands of operation, a four-position band switch 36 is used. A detailed disclosure of a suitable controllable inductor circuit and band switch arrangement is made, and it is claimed in my co-pending application Serial No. 457,265, filed September 20, 1954. With the switch 36 in Band No. 1 position all of the signal windings 16, 18, 20 and 22 are connected in series, providing the lowest range of frequencies. As the switch is set to higher bands, that is, to Band No. 2, No. 3, and No. 4 positions respectively, the windings 22, 20, and 18 are shorted out in succession by the conductive switch disk 38 which connects the long contact 39 with the shorter contacts 40, 42, and 44 in succession. Switch 38 is shown in Band No. 4 position in which all of the windings except the split winding 16 are short-circuited for operation over the highest frequency range.

In order to sweep the oscillator frequency, the control winding 34 is connected by leads 45 in series with a rectifier 46 and across a potentiometer 48, which in turn is connected by leads 50 across opposite sides of a 120 volt, 60 cycle A. C. power circuit, indicated by a conventional plug 52. Between the leads 50 and the plug 52 is a balanced high frequency filter circuit including a pair of coils 54 in series with the line and four shunt capacitors 56 connected to the common return circuit of the instrument, i. e., "grounded." Adjusting the movable contact 58 along the potentiometer 48 changes the amplitude of the unidirectional control current pulses fed through the windings 34 and hence adjusts the magnitude of the deviation in frequency produced by the oscillator circuit 2.

In the oscillator circuit, the junction of the two halves of the adjustable condenser 14 is connected to ground by a lead 58. One side of the condenser 14 is coupled through a condenser 60 and across a grid return resistor 62 to the grid 64 of the tube 13 having its cathode 65 grounded. The lower end of the resistor 62 is connected to the plate 66 of the tube 8.

The plate 67 of tube 13 is directly connected to the other side of the condenser 14 by a lead 68. The high voltage direct current plate power for the tube 13 is fed from the cathode 70 of the series voltage regulator tube 4, through a lead 74 and through a radio frequency choke 76 to a lead 78 in the controllable inductor 24 connected through one half of the winding 16 to the plate 67.

The output from the oscillator circuit is fed from the plate 67 through a coupling condenser 80 and across a grid return resistor 82 to the grid 84 of the cathode follower 10 with its plate 88 effectively tied to the ground circuit through a condenser 90 and its cathode 92 returned to the common ground circuit through a resistor 94. The plate voltage for the tube 10 is fed from the plate 95 of a voltage regulator tube 96 in the power supply circuit 98 through a lead 100.

The signals appearing across the resistor 94 are coupled through a condenser 102 and along a shielded wire 104 to the attenuator circuit 11. This circuit includes a potentiometer 106 for fine adjustment of the magnitude of the output signals, which is connected to the end of the shielded wire 104, with the sliding contact 108 of the potentiometer being connected through a resistor network 110 and a switch 112 connected to the jack 12 and providing step adjustment of the output.

In operation, the rectifier 46 applies a pulse of driving voltage to the windings 34 every alternate half cycle of the 60 cycle A. C. current. Due to the relatively large inductance in the windings 34, the current through them is substantially continuous, rising from zero to a maximum during the half cycle when the driving voltage is applied through the rectifier 46 and decreasing back to zero at about the end of the full cycle.

In operation, during the first half of each cycle of the A. C. power in which the current in the windings 34 is increasing, the frequency from the oscillator circuit sweeps up, the starting point being adjusted by the setting of the condenser 14. During this upward sweep, the lower end of the resistor 62 is effectively connected to the common return circuit by means of the clamper circuit 7. This is done by the tube 8 which is connected as a diode and has its plate 66 connected by a resistor 114, and a shunt condenser 116 and a lead 117, to one side of the secondary 118 of a step-up power supply transformer 120 having its primary 122 conected through the line filter to the plug 52. The cathode 124 of the tube 8 is grounded. During the upward sweep of the circuit 2, the voltage fed through the resistor 114 and condenser 116 to the plate 66 is positive, putting the tube 8 in full conduction, and effectively grounding the lower end of the resistor 62.

During this sweep, the amplitude of the oscillations in circuit 2 are held constant by the circuit 3. These oscillations are fed from the plate 67 of the tube 13 through a condenser 124 to a resistor 126 having its other end connected to the return circuit. A crystal rectifier 128 rectifies the signals appearing across the resistor 126 to produce a positive voltage which is fed through an isolating resistor 130 and along a shielded wire 132 to the grid 134 of the regulator control tube 5.

Whenever the amplitude of the oscillations starts to increase, the voltage fed to the grid 134 increases, increasing the current flowing from the plate 136 to the cathode 138 of the tube 5, thus increasing the voltage drop across the plate load resistor 140 which is also connected through a lead 141 to the grid 142 of the tube 4. Thus, the voltage on the grid 142 is lowered with respect to the cathode 70, reducing the current flowing from the power supply through the lead 143 to the plate 144 and through the tube 4 to the lead 74, thus reducing the voltage on the plate of the oscillator tube to hold constant the amplitude of the oscillations in the circuit 2. Should the amplitude of the oscillations in the circuit 2 start to decrease, then the action of the tubes 4 and 5 is just opposite, so as to raise the voltage on the lead 74 and maintain the amplitude of the oscillations constant.

In the circuit 3 the screen 146 of tube 5 is tied through a lead 148 and the lead 100 to the regulator tube 96 to hold the screen voltage constant. The cathode 138 is connected to a voltage dropping circuit comprising a resistor 150 connected from the lead 100 to a variable resistor 152 connected to the cathode, which is connected through a resistor 154 to ground. A condenser 156 is shunted across the resistor 154 and connected to the suppressor grid 158 of the tube 5.

The variable resistor 152 is used to adjust the voltage of the cathode 138 so as to adjust the amplitude of oscillations in the circuit 2.

During the second half of the A. C. cycle when a decreasing current flows in the windings 34, the oscillator circuit 2 is deenergized and also the voltage on the grid 64 is swung far negative to cut off the tube 13 so as to stop, i. e. "blank" out, the downward frequency sweep which otherwise would occur as the current through the control windings 34 decreases.

The tube 13 is biased below cut-off by the negative half cycle of voltage from lead 117, for as the top half of the secondary 118 swings negative the tube 8 stops conducting and the full negative voltage is applied through the resistor 114 and the resistor 62 to the grid 64.

To prevent the regulator circuit 3 from fighting against the blanking circuit 7, the voltage on the lead 74 is reduced effectively to zero by a clamping action of the tube 6, thus completely deenergizing oscillator 2. The cathode 160 of the tube 6 is grounded, and its grid 162 is connected by a lead 164 and a resistor 166 and shunt condenser 168 to the opposite side of the secondary 118 from the lead 117.

As the lead 117 goes negative, the grid 162 is driven far positive causing the tube 162 to conduct fully, drawing a large current through the lead 143 and through the resistor 140 to the plate 170 of the tube 6, and so disabling the regulator control tube 5 and also biasing the tube 144 below cut-off, reducing the voltage on the lead 74 and effectively deenergizing the oscillator circuit 2.

During the start of the next half cycle, when the lead 164 again swings negative, the tube 6 is cut off, allowing the circuit 3 again to feed regulated voltage through the lead 74. At the same time, the tube 8 again conducts to clamp the bottom end of the resistor 62 to ground.

Connected between the plate 170 and the ground circuit is a resistor 172 in series with a condenser 174. This series circuit advances the phase shift in the plate circuit of the tube 170 and so prevents oscillations in the control circuit 3.

Because of the inductance in the windings 34, the maxima and minima of the control current lag somewhat behind the instants of time when the A. C. voltage is zero and the relative voltage on the leads 117 and 164 is reversing. In order to make the clamping action of the tubes 6 and 8 coincide with these maxima and minima, the condensers 116 and 118 are used. The condenser 116 is fairly large (.02 microfarad) and maintains a negative bias on the grid 64 for a period of time after the lead 117 has begun to swing positive, thus assuring that the oscillations cannot start until after the control current has reached its minimum and started to increase.

Similarly, the condenser 168 delays the reduction of the voltage on the grid 162 for a brief period and hence clamps the grid 142 of the tube 4 near ground potential until after the control current reaches its minima.

Among the advantages of the blanking of the return sweep is that it gives a zero reference voltage "trace" on any oscilloscope used with this sweep generator.

The power supply circuit 98 includes a full wave rectifier tube 176 and a filter including a pair of shunt condensers 178 and a series resistor connected to the lead 143. Another filter resistor 182 is connected from this filter to feed the plate 95 of the voltage regulator tube 96.

I find that the following values for some of the circuit components are suitable to provide the desired operation:

| Resistors: | Value (ohms) |
|---|---|
| 48 | 500, 25 watts. |
| 62 | 4700. |
| 94 | 270. |
| 114 | 47K, 1 watt. |
| 126 | 2.7M. |
| 140 | 100K. |
| 166 | 1M. |
| 172 | 3300. |

where: K=1,000; M=1,000,000.

| Condensers: | Value (farads) |
|---|---|
| 14 (each half) | 6 to 150 mmf. |
| 60 | 200 mmf. |
| 80 | 5 mmf. |
| 116 | .02 mmf. |
| 124 | 100 mmf. |
| 156 | 20 mf., 25 volts. |
| 168 | .001 mmf. |
| 174 | 680 mmf. |

where: m=micro:

| Tubes: | Type: |
|---|---|
| 4 | 6AQ5 |
| 5 | 6AU6 |
| 6, 8 | 12AU7 |
| 10, 13 | 12AT7 |
| 96 | OA2 |
| 176 | 6X5 |

From the foregoing description it will be understood that I have provided sweep generator method and apparatus well adapted to provide the advantages set forth and that the apparatus may be changed or modified in accordance with the needs of particular applications and that the scope of my invention as defined by the following claims is intended to cover such alterations and modifications, limited only by the prior art.

What is claimed is:

1. Apparatus for generating cyclic sweeps in the frequency of a signal comprising a controllable inductor having core means, control and signal windings on said core means, a resonant circuit, said signal winding being included in said resonant circuit, amplifier means having control and controlled electrodes coupled to said resonant circuit and producing oscillations therein, circuit means connectible to a source of A. C., half wave rectifier means between said circuit means and said control winding, and a blanking circuit coupled from said circuit means to an electrode of said amplifier, said blanking circuit stopping oscillations in said resonant circuit between sweeps.

2. Apparatus as claimed in claim 1 and wherein said blanking circuit comprises a resistor, rectifier means having first and second terminals, one terminal being coupled to said A. C. circuit means, the other terminal being coupled through said resistor to an electrode of said amplifier.

3. Apparatus as claimed in claim 1 and wherein said blanking circuit comprises a resistor, a diode having plate and cathode elements, said cathode element being coupled to said circuit means, said A. C. plate being coupled through said resistor to the control electrode of said amplifier.

4. Apparatus for generating cyclic sweeps in the frequency of a signal comprising a controllable inductor having core means and control and signal windings thereon, a resonant circuit, said signal winding being included in said resonant circuit, amplifier means having control and controlled electrodes coupled to said resonant circuit, circuit means connectible to a source of A. C., half wave rectifier means between said circuit means and said control winding, a first blanking circuit coupled from said circuit means to said control electrode of said amplifier, and a second blanking circuit coupled from said circuit means to said controlled electrode of said amplifier.

5. Apparatus as claimed in claim 4 wherein said second blanking circuit comprises a voltage regulator circuit connected to said controlled electrode, a control terminal in said voltage regulator circuit, and circuit means coupling said control terminal to said circuit means.

6. Apparatus for generating cyclic sweeps in the frequency of a signal comprising a controllable inductor having core means and control and signal windings thereon, an input circuit connectible to an A. C. power source, an adjustable resistor connected to said input circuit, rectifier means connected between said adjustable resistor and said control winding, and an oscillator having a resonant circuit coupled to said signal winding, whereby the width of sweep is readily adjusted by said variable resistor.

7. Apparatus for generating cyclic sweeps in the frequency of a signal comprising a controllable inductor having core means and control and signal windings thereon, an input circuit for said apparatus connectible to an A. C. power source, an adjustable resistor connected to said input circuit, rectifier means connected between said adjustable resistor and said control winding, a common circuit in said apparatus, an oscillator having a resonant circuit coupled to said signal winding, said oscillator being connected to said common circuit, a transformer having primary and secondary windings, its primary being connected to said input circuit, the secondary of said transformer having a center tap connected to a common circuit, and a blanking circuit connected from one side of said secondary to said oscillator.

8. Apparatus as claimed in claim 7 and wherein said oscillator includes a vacuum tube having a control electrode, a resistor connected to said control electrode, and said blanking circuit comprises a diode having two terminals, phase shift circuit means connecting a terminal of said diode to said side of said secondary.

9. Apparatus as claimed in claim 8 and wherein said phase shift circuit is a resistor shunted by a condenser.

References Cited in the file of this patent

UNITED STATES PATENTS

| | | |
|---|---|---|
| 2,151,313 | Bagno et al. | Mar. 21, 1939 |
| 2,291,715 | Hepp | Aug. 4, 1942 |
| 2,407,270 | Harrison | Sept. 10, 1946 |

FOREIGN PATENTS

| | | |
|---|---|---|
| 439,166 | Great Britain | Dec. 2, 1935 |